Patented July 25, 1939

2,167,140

UNITED STATES PATENT OFFICE 2,167,140

TREATMENT OF GAS DISTRIBUTION SYSTEMS

Duncan B. Williams, Glen Ridge, N. J., assignor to The United Gas Improvement Company, a corporation of Pennsylvania No Drawing. Application October 4, 1937, Serial No. 167,316

6 Claims. (Cl. 48—190)

This application is a continuation-in-part of my copending application Serial Number 673,618 filed May 31, 1933, now Patent 2,094,691 issued October 5, 1937, and pertains generally to the treatment of the interiors of gas mains or other gas conduits for the purpose, among other things, of laying dust.

Systems for the distribution of gas generally consist of conduits or mains usually laid underground. Until recently when welded joints have come into more common use, these conduits were constructed of sections of pipe, usually of cast iron, joined by means of bell and spigot or other joints. Bell and spigot joints were in many cases packed with hemp, jute, flax or other cellulosic fiber material, and sealed with lead or cement in a well-known manner. Treatment of gas conduits having fiber packed joints involves swelling of the fiber packing as described and claimed in my above mentioned copending application. This invention pertains more particularly to the treatment of gas conduits having other than fiber packed joints.

Manufactured gas for a long period of years has been produced for the most part locally, that is, in or near the cities to be supplied, and until recently no special effort has been made to recover condensible materials from the gas prior to its delivery to the mains.

Since the gas during its manufacture is passed through the wash box and purifying apparatus containing large quantities of moisture, it is upon delivery to the mains more or less saturated with water and is generally referred to as being wet.

The lower temperatures of the mains, particularly during cool weather, causes considerable condensation of water as well as other materials known generally as "drip oil".

Over a period of years this condensed water, together with other constituents of the gas, such as carbon dioxide, hydrogen sulfide, hydrocyanic acid, naphthalene, etc., has caused extensive corrosion of the interior walls of the mains. The products of corrosion have built up on the walls of the mains and in many instances large quantities have become disconnected and have collected along the bottom.

Due to the presence of the relatively large quantities of moisture responsible for the corrosion in the first instance, the products of corrosion were maintained in a wet condition and did not tend to form dust in any appreciable quantity.

Therefore, until high pressure distribution came into practice and while the use of natural gas, or natural gas mixtures, was less wide-spread, very little difficulty was experienced with the formation of dust in the mains from the products of corrosion. In fact, traps or "drips" were installed at low points in the mains to catch condensed hydrocarbons, known collectively as "drip oil" as well as the condensed water.

However, when manufactured gas is compressed to obtain a sufficiently high pressure for delivery in large quantities at distant points, considerable quantities of moisture (which term is used collectively for all condensible materials) are condensed out. When this gas is re-expanded at its destination for local distribution, its relative moisture content is low and the gas is referred to as being "dry". There is then no longer sufficient moisture in the gas to keep the products of corrosion wetted down. On the contrary, the gas is so dry that it will draw out any remaining moisture in and on the corrosion products.

In other words, as long as the main is used for distributing ordinary moist manufactured gas, very little trouble with dust resulting from corrosion is experienced. However, when the service is changed over to a manufactured gas of low moisture content, or over to natural gas which is characterized by a very low moisture content, the moisture on and in the corrosion products dries out, and such products become a serious source of dust.

The presence of considerable quantities of dust in the gas flowing through the mains of a distribution system is very undesirable because dust tends to clog up customers' service connections, interferes with the proper operation of meters and tends to clog up burners and pilot outlets.

Under extreme conditions corrosion may be so severe as to form a serious obstruction in the main itself by reducing its effective cross sectional area, or by accumulation of dust in piles in the main.

A number of methods of correcting dust troubles have been proposed and used.

For instance, excavations have been made at suitably spaced points along the main, say every three hundred feet, the main severed at each excavation and the accumulations removed mechanically.

This has been done by dragging a ball of chain back and forth through the disconnected section and increasing the size of the ball as more and more of the products of corrosion have been removed. In some instances a cutter has been substituted for the ball of chain.

In another method a compressor is converted to function as a suction device for sucking air through the disconnected main section and the dust is collected in a bag, in a manner customary in the operation of the ordinary vacuum cleaner.

It will be appreciated that either of the foregoing methods is very expensive in view of the immense amount of labor involved. Furthermore, both methods put the main out of service during the treatment.

Steam has been introduced into the main while in service but this method has the disadvantage that the deposited moisture dries out as soon as steaming is stopped. As far as I am aware, the same applies to the fogging of oil into the mains, since the oil which it has been necessary to use for successful fogging has had to be so light as to make it appreciably volatile.

Furthermore, since the corrosion products comprise not only ordinary iron rust but also a variety of other compounds resulting from the activity of hydrogen sulfide, hydrocyanic acid, naphthalene and other corrosive substances, the problem of wetting down the dust, of wetting the main wall and of thoroughly spreading a dust laying liquid becomes a major factor.

I have discovered that a certain class of liquids generally, and certain liquids within this class more particularly, are excellently adapted as dust laying agents for treatment of gas conduits, and that gas conduits treated with such liquids are maintained dormant as sources of dust for very long periods of time, if not permanently.

Broadly, a liquid to be suitable for the purposes of my invention, should have certain properties.

The liquid should be substantially non-volatile; that is, it should have a relatively high boiling point and a low vapor pressure so that evaporation is negligible even when the main is used for conducting very dry gas.

The liquid should be chemically and physically inert with respect to the gas; that is, the gas should have substantially no affinity for the liquid.

The liquid should preferably be hygroscopic so that the presence of moisture will assist rather than resist thorough and complete wetting of the main wall and of the corrosion products by the liquid. In this connection, it is to be observed that liquids of the prior art such as "drip oil" or petroleum oil are non-hygroscopic in character, and are characterized by being completely non-miscible with water. Since it is a well recognized fact that when a solid is contacted with two immiscible liquids, one of the liquids will wet the solid to the exclusion of the other, and since this phenomenon has been shown to apply particularly to mineral oil and water, it will be seen that thorough and complete distribution of a mineral oil is not possible in the presence of even a trace of water. It will be recognized that the surfaces of corrosion products in the mains may become sufficiently dry to cause serious dust troubles without the entire mass losing its water content. Therefore, the importance of this property in my treating liquids cannot be overestimated.

The liquid preferably has good surface wetting properties with respect to both the products of corrosion and the uncorroded metal walls of the main. This will facilitate spreading of the liquid throughout the main and the body of corrosion products even when contact with the liquid is only over a small area, say along the bottom of the main.

A mixture of various liquids may be used.

In accordance with my invention liquids having the above-mentioned desirable properties comprises the high boiling water miscible alcohols.

In this group I include monohydroxy, dihydroxy and polyhydroxy alcohols.

Among the monohydroxy alcohols I prefer those containing eight or more carbon atoms, such as octyl, lauryl, and cetyl alcohol. In this group also fall the alkoxy alcohols, such as the higher monoalkyl ethers of the glycols, the monoamyl ether of ethylene glycol being an example, and the alkoxy alkenoxy alcohols, such as the monoalkyl ethers of the polyglycols, examples being the monoethyl ether of diethylene glycol, the monoethyl ether of triethylene glycol, and the monobutyl ether of diethylene glycol.

The dihydroxy alcohols include the glycols and polyglycols of the 1-2 series, such as ethylene glycol, diethylene glycol, triethylene glycol, propylene glycol, and dipropylene glycol.

The polyhydroxy alcohols include the glycerols, polyglycerols, and glycerol alkyl ethers.

The lower monohydroxy alcohols are generally not suitable to be used alone because they are too volatile. However, these and other volatile liquids which are good solvents are not to be excluded since they may be used as solvents for less volatile, more viscous liquids falling within the groups before enumerated to facilitate their application to the conduit walls and to the products of corrosion.

The treating liquid may be applied to the interior surface of a pipe section before, during, or after its installation in the main or conduits in any desired manner, such as by spraying, brushing or otherwise.

If the main or conduit is already in service, sections of the conduit may be "blocked off" by means or inflated bags or other means, and the sections then completely filled with the liquid, after which the liquid can be drawn off and re-used. Also, the liquid may be sprayed into the gas by the fogging process already mentioned so that the corrosion products absorb the liquid from the gas stream and the liquid is deposited from the gas stream onto the walls of the conduit. In another method of application, the liquid is introduced into the main at high points and allowed to run by gravity to low points where the excess can be drawn off. Another method comprises inserting a long length of hose into the main with a spray at its end or with a plurality of sprays or openings distributed along its length, and pumping the treating liquid into the hose while withdrawing the hose either continuously or intermittently or otherwise, or while the hose remains stationary.

In the last three methods of application, service on the line need not be interrupted, and the entire deposit of corrosion products as well as the walls of the mains become coated with the treating liquid. The wetting qualities of the treating liquid cause it to spread and wet exposed surfaces. This wetting of finely divided materials causes them to be bound together in a mass which prevents them from rising in a dust regardless of the velocity of the gas travelling through the conduit. The clogging of mains, meters, regulators and appliances is thus effectively prevented.

The presence of water does not interfere with but actually assists the spreading of the treating liquid.

Any other means for applying the liquid to the interior of the conduit may be employed.

As previously stated, the presence of water assists the wetting and spreading of the treating liquids. If desired, therefore, water may be employed to assist in the wetting and spreading of these liquids such as by first wetting with water, for instance, steaming, following by application of the treating liquid, or water may be added to the treating liquid, or otherwise employed in the treatment. The substantially universal and excellent wetting qualities of water are thus added to those of the treating liquids.

By the term "water miscible" as used in the claims is meant miscible with water in large quantity at ordinary temperatures.

It is to be understood that the above particular description is by way of illustration and that changes, omissions, additions, substitutions and/or modifications may be made within the scope of the claims without departing from the spirit of the invention.

I claim:

1. A method for treating the interior of a gas conduit having other than fiber packed joints to lay dust, comprising coating dust sources within said conduit with an alcohol selected from a group consisting of octyl alcohol, lauryl alcohol, cetyl alcohol, monoamyl ether of ethylene glycol, monoethyl ether of diethylene glycol, monoethyl ether of triethylene glycol, monobutyl ether of diethylene glycol, ethylene glycol, diethylene glycol, triethylene glycol, propylene glycol, and dipropylene glycol.

2. A method for treating a gas conduit having other than fiber packed joints to lay dust, comprising coating dust sources within said conduit with a liquid comprising a water miscible high boiling alcohol.

3. A method for treating a gas conduit having other than fiber packed joints to lay dust comprising wetting down dust sources within said conduit with a liquid comprising ethylene glycol.

4. A method for treating a gas conduit having other than fiber packed joints to lay dust comprising wetting down dust sources within said conduit with a liquid comprising diethylene glycol.

5. A gas conduit with other than fiber packed joints having its interior dust sources wetted down by a water miscible high boiling alcohol.

6. A gas conduit with other than fiber packed joints having its inner walls coated with an alcohol selected from a group consisting of octyl alcohol, lauryl alcohol, cetyl alcohol, monoamyl ether of ethylene glycol, monoethyl ether of diethylene glycol, monoethyl ether of triethylene glycol, monobutyl ether of diethylene glycol, ethylene glycol, diethylene glycol, triethylene glycol, propylene glycol, and dipropylene glycol.

DUNCAN B. WILLIAMS.